United States Patent [19]

Credle, Jr.

[11] Patent Number: 4,550,624

[45] Date of Patent: Nov. 5, 1985

[54] REVERSING MECHANISM MODULE FOR A DOUBLE ACTING RECIPROCATING PUMP AND METHOD FOR REPAIRING THE PUMP

[75] Inventor: William S. Credle, Jr., Stone Mountain, Ga.

[73] Assignee: The Coca-Cola Company, Atlanta, Ga.

[21] Appl. No.: 544,060

[22] Filed: Oct. 21, 1983

Related U.S. Application Data

[60] Division of Ser. No. 320,584, Nov. 12, 1981, Pat. No. 4,436,493, which is a continuation-in-part of Ser. No. 77,544, Sep. 21, 1979, abandoned.

[51] Int. Cl.[4] ....................... F16H 21/10; F16K 31/44

[52] U.S. Cl. .................................. 74/110; 74/100 R; 251/75

[58] Field of Search ......................... 251/291, 75, 280; 74/100 R, 110; 137/454.2, 454.4, 454.6, 512, 512.3

[56] References Cited

U.S. PATENT DOCUMENTS

| | | | |
|---|---|---|---|
| 1,766,010 | 6/1930 | Binderup | 91/347 |
| 2,486,707 | 11/1949 | Elkington | 91/347 X |
| 2,868,177 | 1/1959 | Graybill | 91/347 X |
| 2,977,040 | 3/1961 | Dulebohn | 417/393 X |
| 4,436,493 | 3/1984 | Creole, Jr. | 417/393 |

FOREIGN PATENT DOCUMENTS

| | | |
|---|---|---|
| 885317 | 1/1981 | Belgium . |
| 80/5694 | 10/1981 | South Africa . |
| 323827 | 1/1930 | United Kingdom . |

*Primary Examiner*—Leonard E. Smith

*Attorney, Agent, or Firm*—Birch, Stewart, Kolasch & Birch

[57] ABSTRACT

A module for use with a double-acting reciprocating pump includes a housing removably attached to the body of the pump. The module has a snap-acting reversing mechanism therein operatively associated with a spool valve which alternately directs driving fluid to two respective driving sections of the double-acting pump. If the module malfunctions, a new module or one including replacement parts, such as a new spool valve, can be substituted for the original module.

16 Claims, 18 Drawing Figures

REVERSING MECHANISM MODULE FOR A DOUBLE ACTING RECIPROCATING PUMP AND METHOD FOR REPAIRING THE PUMP

BACKGROUND OF THE INVENTION

This application is a divisional of prior application Ser. No. 320,584, filed Nov. 12, 1981, now U.S. Pat. No. 4,436,493 which was a continuation-in-part of prior application Ser. No. 077,544, filed Sept. 21, 1979, now abandoned.

This invention relates to a pneumatically-operated diaphragm pump utilized in a Post-mix beverage syrup dispensing system and more specifically to a reciprocating pump including a spring actuated reversing means for reversing the direction of a reciprocating pump at the end of its respective strokes.

Diaphragm pumps are widely used particularly for pumping liquid solutions and highly viscous materials and are frequently used under conditions such that the viscosity of the fluid being pumped, the head of the suction side of the pump and the back pressure on the pump discharge may all vary as conditions under which the pump is operating vary. The speed of such pumps has generally been controlled by inserting an adjustable valve in the air line leading to the pump. However, this approach requires that the operation of the pump be kept under continuous observation and the valve adjusted to suit varying conditions, otherwise the speed of the pump will vary substantially depending upon the conditions of operation. For example, if the back pressure on the pump should increase or decrease for any particular reason, or if the viscosity of the liquid being pumped should vary, then the speed of operation and the quantity of liquid being pumped per unit of time will accordingly be affected. Therefore, it is highly desirable that the pump be controlled such that it operates at a substantially constant speed under varying conditions. Furthermore, it is essential that the entire pumping cycle be completed so as to ensure continuous delivery of the medium being pumped at a constant consistency or concentration. In order to ensure the latter, means have been suggested such as disclosed in U.S. Pat. No. 4,008,984 wherein opposed coil springs are provided for assisting the respective valve member in the completion of its pumping cycle. The coil compression springs of identical force under the pressurized gas system assist in completion of the pumping cycle first in one direction, and then by asserting a positive reversing effect when either of the springs becomes fully compressed. Although providing a reversing mechanism for the double acting pump disclosed, there are inherent disadvantages with such a system. For example, if for some reason the pressurized system is effected in such a way that a back pressure is created or established so as to inhibit or reverse the pumping cycle before it is completed, there is no means for overcoming the undesirable effect, and the fully compressed state of the spring is not reached. Thus, it is possible that the pumping cycle could be reversed regardless of the presence of the compression springs, before the cycle is completed, thus effecting the efficiency, if not the complete purpose, of the reciprocating pump.

It is, therefore, an object of the present invention to provide a reciprocating diaphragm pump for delivering, under constant pressure, syrup to a Post-mix beverage dispensing system which will overcome the above noted disadvantages.

It is a further object of the present invention to provide a double-acting reciprocating pump for syrup in a Post-mix beverage dispensing system wherein a reversing means is provided for reversing the direction of the pump at the end of each respective stroke.

Yet, still a further object of the present invention is to provide a gas-operated diaphragm pump including a specialized valve, actuated by a springloaded member attached to a common shaft, which alternates the supply of pressurized gas to the respective diaphragms.

It is still a further object of the present invention to provide a double-acting reciprocating pneumatic pump for dispensing syrup to a dispensing outlet wherein the pump cycle reversing system includes a snap-acting reversing means which ensures the completion of the pumping cycle and precludes the sticking of the pneumatic reversing mechanism in an intermediate position.

Yet, still another object of the present invention is to provide a pneumatic double-acting reciprocating pump having a reversing system which includes a valve, a valve actuating member, and a snap-acting spring member which reliably directs the supply of pressurized gas to the surface of either one of the two diaphragms in a cyclic manner.

A further object of the present invention is to provide a reciprocating pneumatic diaphragm pump including a reversing means which allows for the dispersing of fluid from either one of two diaphragm chambers at the respective ends of the pump in a systematic, controlled manner.

Other objects and further scope of applicability of the present invention will become more apparent from the detailed description given hereinafter. It should be understood, however, that the detailed description and accompanying drawings, while indicating preferred embodiments of the present invention, are given by way of illustration only since various changes and modifications within the spirit and scope of the invention will become apparent to those skilled in the art. Any such changes and modifications should be considered to be within the scope of this invention.

SUMMARY OF THE INVENTION

The foregoing objects and others are accomplished in accordance with the present invention generally speaking by providing a pumping device comprising a pair of flexible diaphragms mounted on the respective ends of a common shaft. The outer surface of the diaphragms are in contact with the liquid to be dispensed by the system, more particularly syrup for a Post-mix beverage dispensing system. The chamber within the pump housing contains an inner wall in which passages are provided for directing compressed air, introduced into the reciprocating pump, to the surfaces of the diaphragms. The flow of air is controlled by a reversing valve adapted so as to redirect the flow of compressed air to the respective diaphragm at the completion of each stroke of the pump in a cyclic manner. A valve actuating member or yoke is provided which engages the shaft within the inner chamber of the pump housing and travels with the pumping action of the shaft. The yoke is designed so as to engage the reversing valve during the terminal phase of the pumping stroke, thus activating the valve and reversing the piston action of the pump. To complete the pump reversing system, a snap-acting spring actuating means interconnected with the yoke of the shaft, is centered within the inner chamber of the housing of the pump, pivotably mounted beneath the shaft connecting the diaphragms. The valve is provided with O-rings positioned within the valve body with respect to the air passages of the valve such that during the first half of the reciprocating cycle, pressurized gas is introduced through the respective passageways and directed to the air chamber of one of the diaphragms. At the same time, a passage is provided for exhaust gases to be released from the air chamber of the remaining diaphragm. Upon interaction with the shaft yoke and the spring mounted actuating means, the relationship of the valve openings to the pressurized gas acting on the surface of the respective diaphragm is changed at the completion of the pumping stroke so as to reverse the action of the pump. The snap-action mechanism provided precludes the sticking of the pneumatic reversing system in an intermediate position.

In operation, pressurized gas is introduced through a passageway into a valve member and is directed via a passageway within the inner wall of the pump housing to the air chamber of one of the diaphragms within the pump. As the piston action of the diaphragm forces syrup from the diaphragm chamber out the appropriate passage to the dispensing outlet, movement of the shaft also moves the remaining diaphragm in a non-pressurizing direction. This same shaft movement also engages the shaft yoke. As the shaft yoke moves, it initiates the pivotal action of a pair of snap-acting compression springs which, prior to rotating off-center, are pushing against each other. As the springs rotate off-center, they uncoil and push the shaft and yoke along in the direction of the established movement. The action of the spring mechanism ensures that the movement of the diaphragm, initiated by the air pressure, is taken to completion by the snap action of the compression springs, while at the same time reversing the flow of pressurized air within the valve member. This procedure is then repeated as long as the dispensing outlet is open and the syrup is being dispensed as a pressurized stream. When the dispensing outlet is closed, sufficient back pressure is exerted on the diaphragms to prevent shaft movement.

It has been determined in the course of the present invention that a reciprocating diaphragm pump for syrup in a Post-mix beverage dispensing system can be provided such that the liquid can be delivered under controlled pressure conditions in a reliable manner. A reversing valve is provided which includes a pair of compression springs bearing one on the other so as not to apply pressure of the bearing surfaces on the pump shaft.

In an alternative embodiment of the present invention, the control or reversing valve, the reciprocating actuating member and the opposed coil springs are provided in a common housing or module. This module is removably secured to the pump body adjacent to the pump shaft and can be removed as a unit for ease of repair. The module housing is preferably molded from plastic in two pieces which slide together with suitable tongue and groove elements. A top one of said pieces houses the control or reversing valve, and has a slot on the underside thereof for receiving the yoke or actuating member of the reversing mechanism. The sides of the slot form bearing surfaces parallel to the longitudinal axis of the pump shaft. In this embodiment, the yoke slides or reciprocates on these bearing surfaces defined by the slot rather than on the pump shaft. A bottom one of said two pieces comprises a support for the opposed snap-acting spring mechanism of the present invention which is sandwiched between said top and bottom pieces. The yoke or actuating member has a pair of upwardly extending spaced arms for engaging opposite ends of the control valve element when it reciprocates, and a pair of downwardly extending spaced arms for engaging a transverse pin in the pump shaft as the shaft reciprocates. A central pin in the yoke couples it to the snap-acting spring mechanism. This embodiment of the present invention also provides an improved spring mounting means for the opposed compression springs and a unique bearing structure therefor.

The present invention further provides a keying or coding technique to assure proper assembly of the inlet and outlet check valves of the pump. These valves are disposed in cylindrical cartridges with coded protrusions on the surface thereof to be received by complementary coded slots in the respective inlet and outlet ports. These protrusions and slots are so arranged that it is impossible to insert a cartridge into the ports backwards with respect to the proper direction of operation. Thus, replacement of the valve cartridges can be properly performed by an unskilled operator and one valve cartridge can be used as either an inlet or outlet valve.

BRIEF DESCRIPTION OF THE DRAWINGS

The present invention will become more fully understood from the detailed description given hereinbelow and the accompanying drawings which are given by way of illustration only and thus are not limitative of the present invention.

DETAILED DESCRIPTION OF THE DRAWINGS

Figure 1:
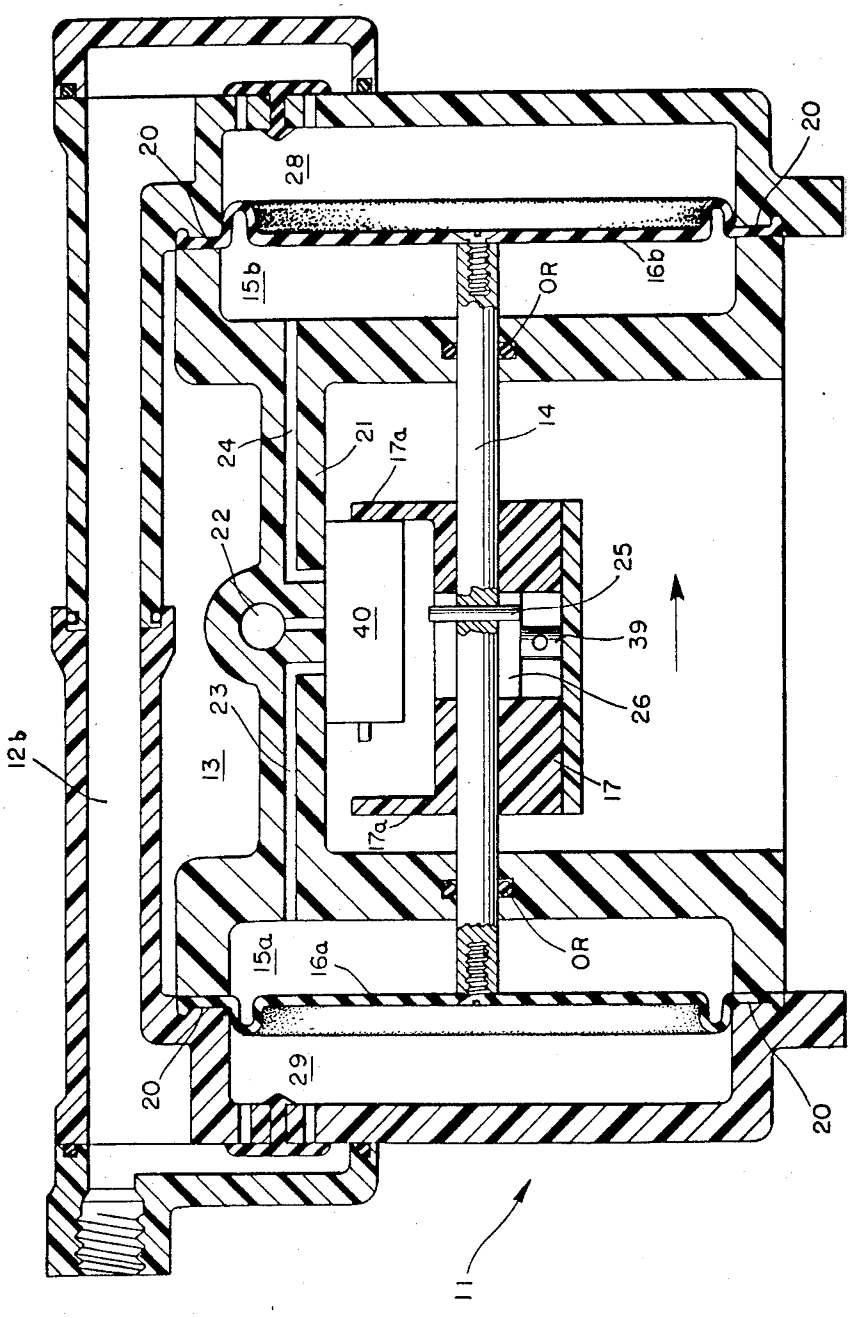
FIG. 1 is a cross-sectional view of a first embodiment of the pump of the present invention representing the initial position of a pressure stroke in the direction indicated.
Figure 1A:
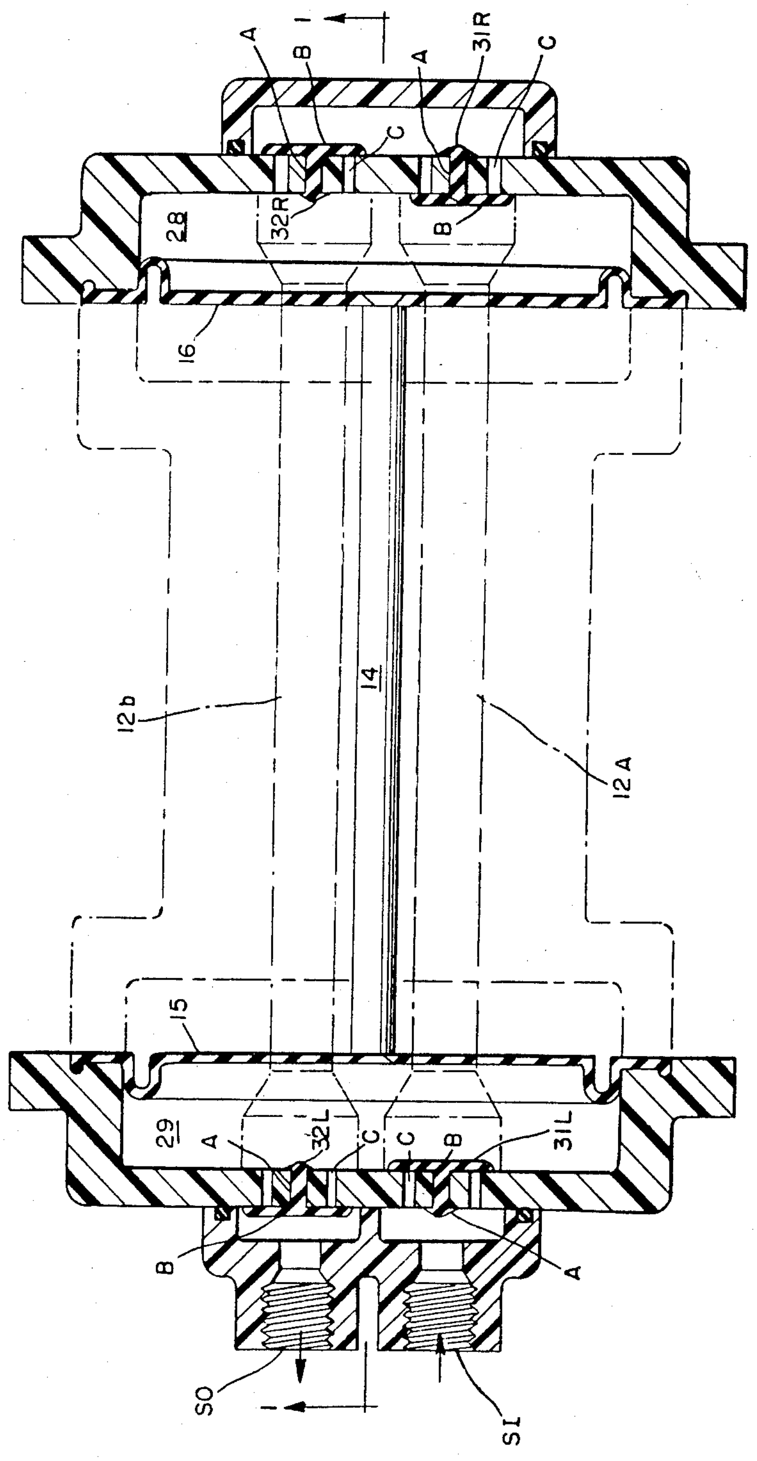
FIG. 1A is a top view of the pump of FIG. 1, illustrating the details of the fluid input and output manifolds and the inlet and outlet valves of the pump of the present invention.

Referring now to FIGS. 1 and 1A, there is seen a cross-sectional side and top view, respectively, of a first embodiment of the reciprocating pump of the present invention generally designated 10, comprising a housing 11 having an input manifold 12A and an output manifold 12B in its top wall for carrying the syrup to be pumped from the inlet SI through the respective chambers discussed below to the pump outlet SO. Within an inner chamber 13 of the pump is positioned a shaft 14 interconnecting diaphragms 16A and 16B. An actuating member or yoke 17 with protrusions or arms 17A is slidably supported on the shaft 14 by the longitudinal bore 17B, FIG. 6, passing therethrough. A reversing valve 40 is attached to the inner wall 21 of housing 11 within the inner chamber 13 of the pump. The shaft 14 is press-fit with a pin 25, which upon operation of the pump, travels with the movement of the shaft a predetermined distance before engaging an end of slot 26 provided in the yoke 17. Shaft 14 is mounted for sliding movement in O-ring seals OR at its respective ends. Pivotally mounted beneath the yoke and interconnected therewith is a spring actuating member 27 (FIGS. 2A, 2B, 3A, 3B) within the housing chamber 13. The reversing effect of the valve 40 is facilitated as a result of the interrelationship between the actuating yoke member 17 and the spring actuating means 27 and alternately directs pressurized gas introduced through passageway 22 to the respective air chambers 15A and 15B, through passageways 23 and 24, to apply pressure to the respective diaphragms 16A and 16B. The reversing valve 40 comprises a valve body 41 and spool element 42 with O-rings 43. A more complete discussion of the operation of the reversing valve can be found below with respect to FIGS. 2A, 2B, 3A, 3B, 4 and 5. Each diaphragm of the pump is constructed of a flexible material, such as rubber, secured to the inner walls of the pump housing at positions 20.

Figure 7:
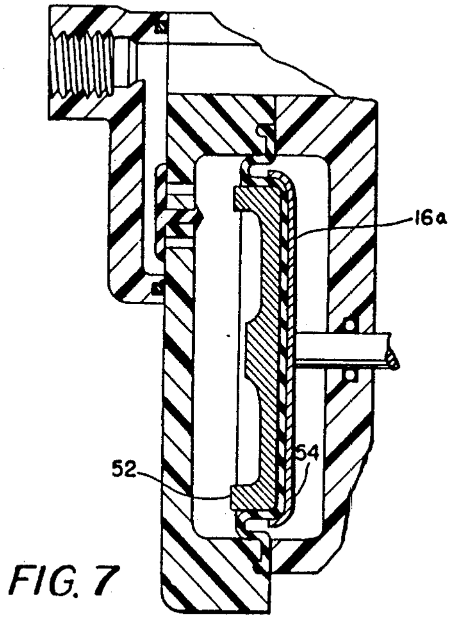
FIG. 7 is a partial view illustrating another embodiment of the pump diaphragm of the present invention.

In a preferred embodiment of the present invention, the diaphragms further include a metal or plastic piston on the outer face of the respective diaphragm and a metal retaining cap on the inner surface of the respective diaphragm, as illustrated in FIG. 7 to be discussed hereinafter.

The pumping cycle of the pump of the present invention and the flow of fluid therethrough can be best illustrated by reference to FIG. 1A. Fluid to be pumped is introduced through an inlet SI to input manifold 12A which extends across the top of the pump and communicates with fluid chambers 28 and 29 via normally closed check valves 31L, 31R. When the fluid pressure in input manifold 12A exceeds the pressure in either chamber 28 or 29, check valves 31L, 31R open. Since the pump of the present invention is a reciprocating pump, the fluid pressures in chambers 28, 29 are always in the opposite state. That is, if the pump shaft in FIG. 1A is moving to the right, chamber 28 has a higher fluid pressure than manifold 12A, and chamber 29 has a lower fluid pressure than manifold 12A. Under these conditions, check valve 31L opens, introducing fluid into chamber 29 and check valve 31R is closed. Thus, as the pump cycles, check valves 31L, 31R alternately open and close.

Outlet check valves 32L, 32R, disposed in an output manifold 12B, function in substantially the same manner. That is, when the pressure output manifold 12B is less than the pressure in one of the respective chambers 28, 29, the check valve in that chamber opens, discharging fluid therefrom to pump outlet SO. In the above example, with the pump shaft 14 moving to the right, the pressure in chamber 28 is high, thus opening valve 32R and permitting the fluid therein to discharge via manifold 12B and pump outlet SO.

The check valves 31L, 31R, 32L, 32R are substantially identical except for the respective orientations thereof. Each is formed from rubber and includes a central stem fixedly mounted in the pump wall, and a disc-shaped seat B, which normally seats on fluid ports C. When biased by fluid pressure to open, disc-shaped seat B flexes away from ports C, permitting fluid to pass therethrough.

The above-described outlet check valves are disposed at the highest positions of chambers 28, 29 to preclude the formation of air pockets which could be sucked out through pump outlet SO, resulting in an uneven flow of fluid.

Figure 6:
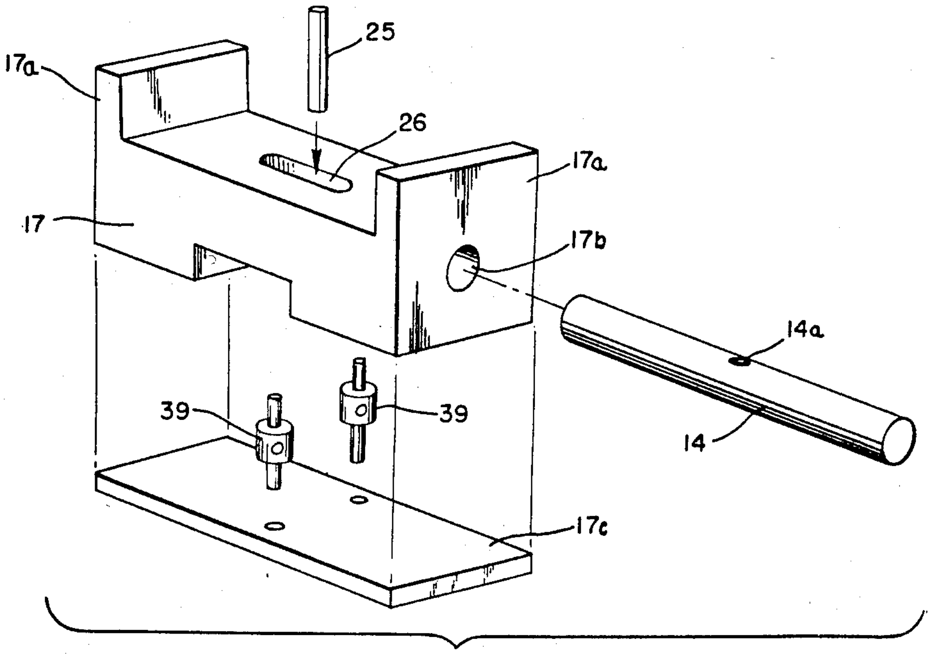
FIG. 6 is an exploded view illustrating the details of how the yoke of the present invention is mounted on the pump shaft.

FIG. 6 illustrates the details of actuating member or yoke 17, which is mounted for movement on shaft 14. Yoke 17 includes a pair of upstanding arms 17A described hereinbefore for engaging the valve 40 and switching the same from one state to another. A longitudinal bore 17B is provided in yoke 17 for receiving pump shaft 14. After pump shaft 14 is inserted in bore 17B, pin 25, described hereinbefore is press-fit into aperture 14A in Shaft 14. A bottom plate 17C is suitably attached to the bottom of yoke 17, thus supporting a pair of pins 39 therein. As will be discussed hereinafter, pins 39 support one pair of ends of spring members of the snap-acting mechanism illustrated in FIGS. 2B and 3B.

Figure 2A:
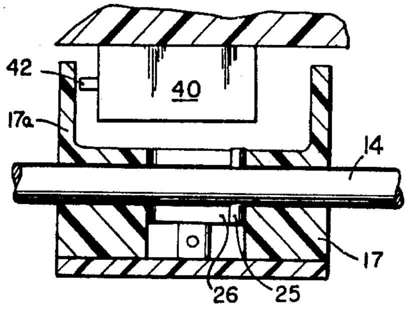
FIGS. 2A and 2B are partial side and bottom views respectively of the pump of FIG. 1, illustrating a first embodiment of the spring reversing system of the present invention as they snap over center toward the right.
Figure 3A:
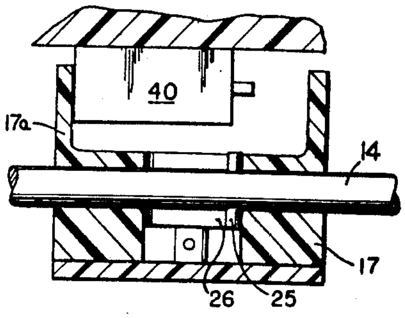
FIGS. 3A and 3B are partial side and bottom views, respectively, of the pump of FIG. 1, illustrating the spring reversing mechanism of the present invention immediately after the snap-over position of FIGS. 2A, 2B, which causes the pump shaft to reverse directions and move to the left.
Figure 2B:
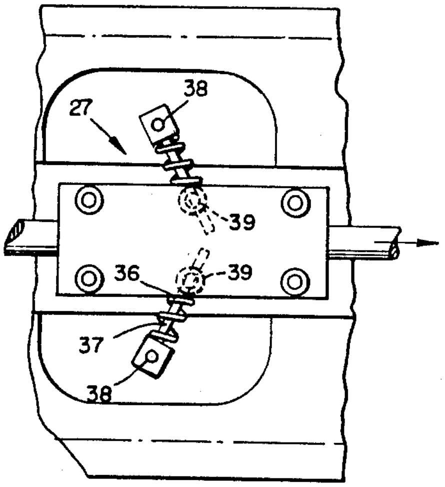
Figure 3B:
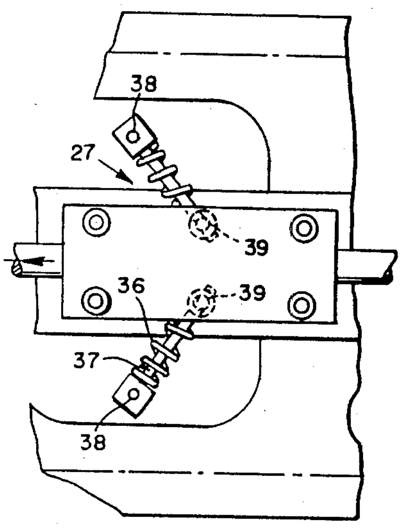

Referring now to FIGS. 2A, 2B, there is seen in cross-section the pump mechanism set forth in FIG. 1 representing a pressure stroke of the pump in the direction indicated at the point of engagement of the pin 25 of shaft 14 with an end of slot 26 in the shaft yoke 17. At this instant, the yoke is picked up by pin 25 and begins to move with the shaft and the spring actuating member 27, connected to the yoke, begins to pass over center. The diaphragm 16 applies pressure to the liquid present in the chamber 28, which is released via check valve 32R into passageway 12B and directed out through the pump outlet SO to the respective discharge stations. FIGS. 2B, 3B represent the position of the diaphragm, shaft and yoke at the completion of the stroke, As the reversing mechanism, generally indicated 27, moves over center, there is produced a snap action effect which thrusts one arm 17A of the yoke against the protruding end of the spool 42, thus changing immediately the position of the O-rings of the valve so as to suddenly reverse the flow of pressurized air through the valve 40 at the completion of the stroke, and reverse the piston action of the pump.

Figure 2C:
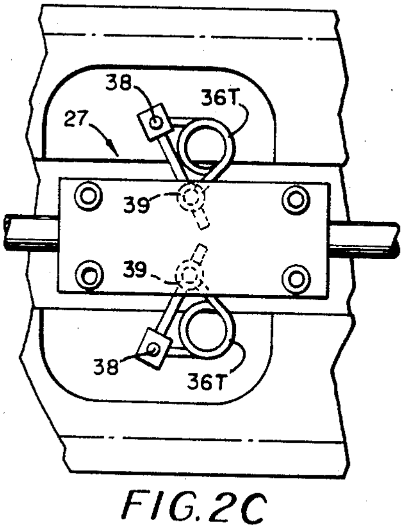
FIG. 2C illustrates an alternate embodiment of compression springs to those illustrated in FIG. 2B.

FIGS. 2B and 3B illustrate the details of the spring reversing mechanism 27. The spring reversing mechanism in one embodiment comprises a coil spring 36 wrapped about a pin 37 and pivotally attached by way of pin 38 to the housing and pin 39 to the yoke 17. Upon engagement by the pump shaft, the yoke 17 will move in the direction of the stroke of the pump, which in turn rotates pins 37 over center about pins 38 such that the springs 36 take over and push the yoke in the direction of the established movement at a speed faster than the shaft movement, until the yoke hits against the spool 42 of the valve mechanism so as to reverse the direction of the flow of pressurized air within the system and establish the piston action of the pump in the opposite direction. The position of the compression springs and yoke at the ends of the stroke are represented in FIG. 3B. The presence of the pins 37 within the coil spring 36 prevents the spring member from buckling during the movement of the piston during the operation of the pump. Alternately, torsion springs 36T may be substituted for the coil springs 36 of FIG. 2B as illustrated in FIG. 2C to provide the snap-acting actuating means of the present invention. The yoke 17 slides or is pushed along by the shaft and spring mechanism 27 of the pump, first in one direction then in a reverse direction according to the reversing action of the valve 40.

Figure 4:
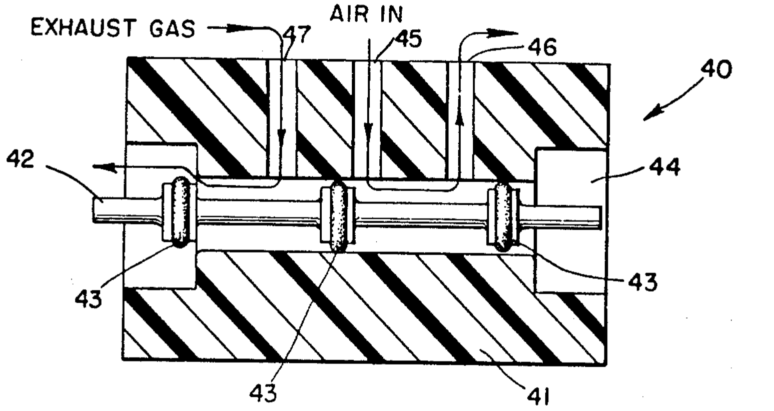
FIG. 4 is a cross-sectional view of the reversing valve of the present invention in the position that it occupies when the pump shaft of FIG. 1 is driven to the right.
Figure 5:
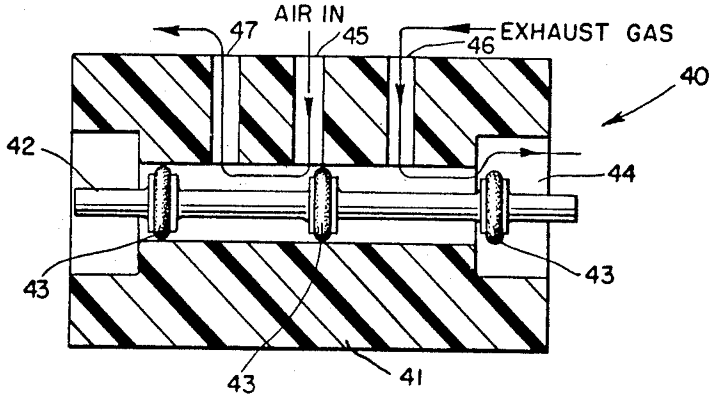
FIG. 5 is a cross-sectional view of the reversing valve of the present invention in t e position that it occupies when the pump shaft of FIG. 1 is driven to the left.

In FIGS. 4 and 5, there is illustrated a simplified enlarged cross-sectional view of the reversing valve 40 of the present invention which is represented herein as a spool valve comprising a valve body 41, the spool 42 having three O-rings 43 intermittently positioned thereon within the valve cavity 44. Within the upper area of the valve body are located air passages 45 coupled to passage 22 of FIG. 1, for introducing the pressurized gas into the valve cavity 44, and 46 and 47 are coupled to passages 23, 24 of FIG. 1, for directing air through the valve to the surface of the respective diaphragms of the pump. The valve 40 herein represented shows air under pressure being introduced to the valve cavity 44 through passageway 45 such that during the first half of the reciprocating cycle, the air is directed to the respective air chamber 15B, through passageway 46 and passageway 24 (see FIG. 1), while at the same time remaining passageway 47 provides for exhaust gases to be released as illustrated from the air chamber of the remaining or opposite diaphragm air chamber 15A. Upon contact by the left protruding end of the spool 42 with the yoke 17 as discussed above, the spool 42 is thrust to the right such that at the end of the pumping action the O-rings 43 shift their position as illustrated in FIG. 5, and the pressurized gas is now directed in the opposite direction so as to be introduced into the air chamber 15A of the diaphragm 16A, thus driving the pump in the opposite direction. In this position, the right end of the spool now projects from the valve cavity 44 and awaits to be engaged by an arm 17A of the shaft yoke in the reverse action of the piston.

In operation, the valve 40 alternates the air flow through the respective passages 23, 24 to the air chambers 15A, 15B of the diaphragms 16A, 16B. The compression springs 36 or 36T interconnected to the yoke continuously urge the shaft of the diaphragm pump first in one direction then the other, responsive to the location of the yoke 17 along the shaft. The pressurized air is introduced into the air chambers 15A, 15B behind the respective diaphragms 16A, 16B and drives the diaphragms so as to discharge the liquid from the diaphragm chambers. As stated above, the yoke 17 on the shaft 14 initially moves in conjunction with the movement of the shaft upon engagement of an end of slot 26 with the pin 25 in shaft 14. The compression springs 36 or 36T, which at the time of engagement are pushing against each other, with substantially no net force in a direction transverse to the pump shaft, pivot over center and apply a further driving force to the yoke which is then caused to move quickly by the snap-action of the springs 36 to seat the projecting portions or arms 17A of the yoke 17 against the protruding spool 42 of the valve 41. This changes the positions of the O-rings within the valve body and reverses the flow of pressurized air therein thus completing the first half of the cycle of the diaphragm pump. The continuous introduction of pressurized air into the valve 40 initiates the pumping action of the shaft mounted piston in the opposite direction, first compressing the springs 36 or 36T and then repeating the action described above in the opposite direction, the compressed springs now pushing in the opposite direction. The spring reversing mechanism ensures that the movement of either of the diaphragms initiated by the air pressure, is completed, thus preventing premature reversal of the pumping stroke or sticking of the valve 40 in a central position.

Referring now to FIG. 7, there is seen in crosssection a pump construction similar to that discussed above with respect to FIGS. 1 and 1A, except with respect to the structure of diaphragms 16A, 16B. The diaphragms 16A and 16B further include cup-shaped plastic or metal plates 52 on the outer face of the respective diaphragm surface and cup-shaped retaining cap 54 on the inner surface of the respective diaphragms. This configuration eliminates the formation of crevices in the flexible diaphragm.

Preferably, the pump housing is constructed of a molded plastic, as herein represented in FIG. 1, such that the valves are mounted through the pump and all the lines or passageways run inside the plastic housing. This construction eliminates unnecesary joints and external lines which contributes to a more reliable system. As is seen in FIG. 1, the inner wall of the housing comprises one continuous member which surrounds the pump reversing system components. The outer walls of the housing 11 are also fabricated of molded plastic which provides for an overall more desirable construction of the diaphragm pump of the present invention.

Figure 8:
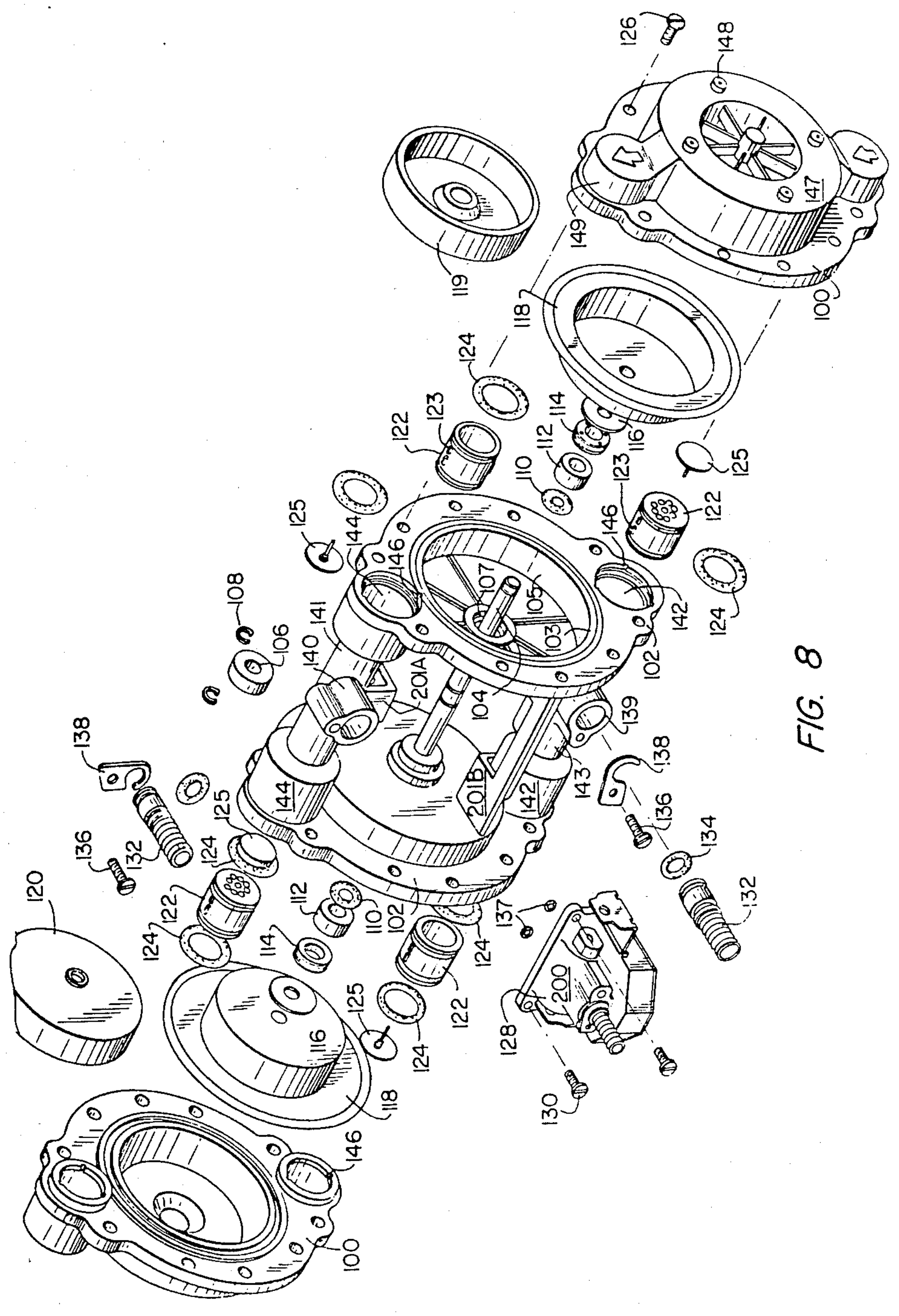
FIG. 8 is an exploded view of a second embodiment of the pump of the present invention and reversing mechanism therefor.
Figure 9:
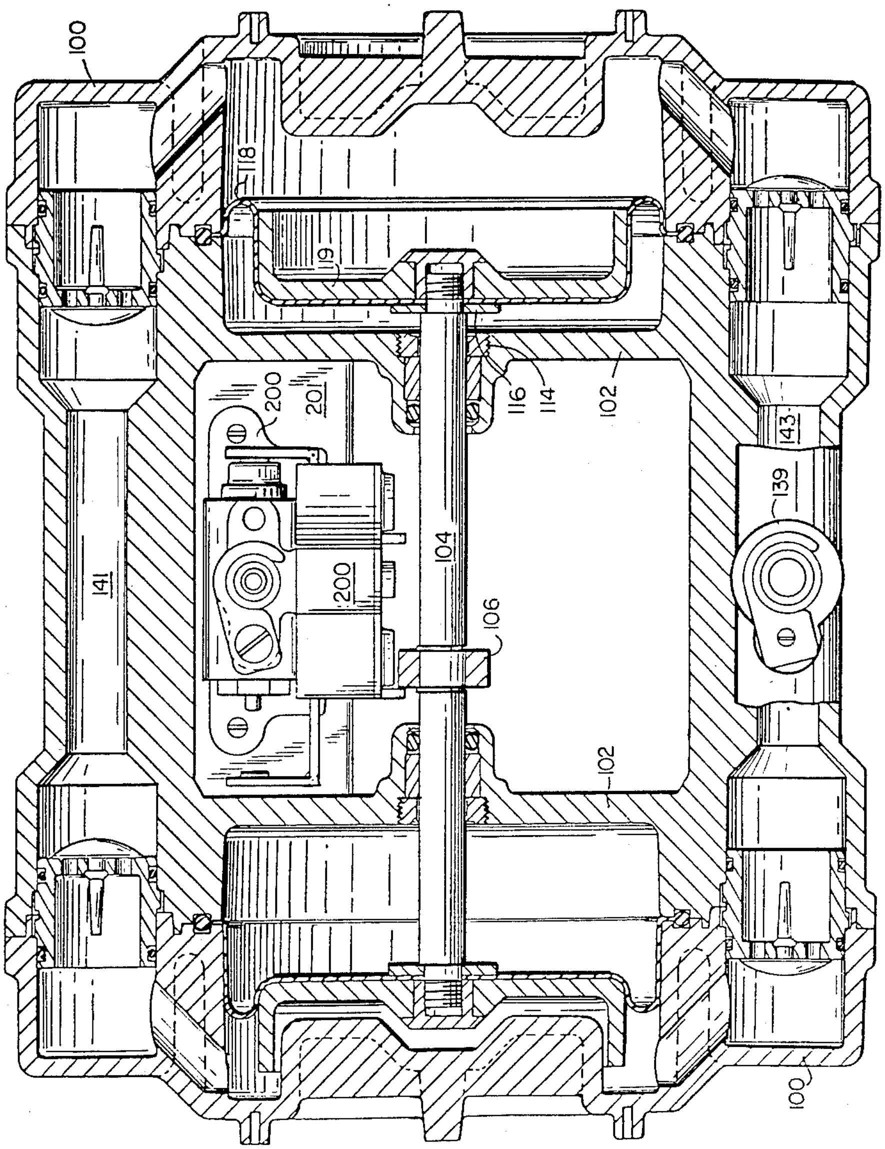
FIG. 9 is a cross-sectional view of a fully assembled pump of the embodiment of FIG. 8.

Referring in detail to FIGS. 8 and 9, there is illustrated an additonal embodiment of a pump construction in accordance with the present invention. FIG. 8 is an exploded view to illustrate how the pump is assembled, and FIG. 9 is a cross-sectional view illustrating the pump in a fully assembled condition. The main pump body includes end sections 102 having fluid discharge chambers 105 formed therein and inlet and outlet ports 142, 144, respectively. In addition, each end section 102 has an annular groove or recess for receiving the flexible diaphragms 118 therein about the periphery thereof. The diaphragms 118 may include metal or plastic piston members 119 nested therein. The end sections 102 of the main pump body also include central apertures 107 for slidably receiving the pump shaft 104 extending between and into the respective discharge chambers 105. The shaft 104 is mounted within apertures 107 by suitable O-rings 110, bushings 112 and retained 114. The ends of the pump shaft 104 are coupled to the diaphragm assembly and, more specifically, pistons 119 by retainers (not shown in FIG. 8 but generally illustrated in FIG. 9) and a suitable washer 116.

The two end sections 102 of the main pump body are molded as one piece with inlet and outlet mainfold tubes 143 and 141, respectively, which connect the two end sections 102 and the respective inlet and outlet ports 142, 144, therein. Fluid inlet 139 is provided in manifold tube 143 and fluid outlet 140 is provided in manifold tube 141. Suitable connectors for flexible rubber hoses such as 132 may be secured to the respective inlet and outlets 139 and 140 by suitable O-rings 134, screws 136 and retainer hooks 138.

Figure 11A:
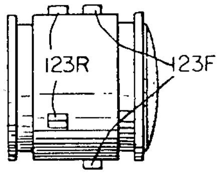
FIG. 11A is a side view of a check valve cartridge of the present invention illustrating coded protrusions thereon.
Figure 11B:
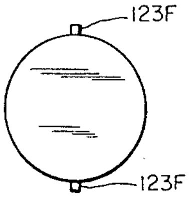
FIG. 11B is a diagrammatic view of only the protrusion configuration adjacent the right end of the cartridge of FIG. 11A.
Figure 11C:
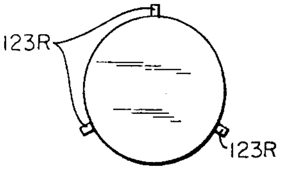
FIG. 11C is a diagrammatic view of only the protrusion configuration adjacent the left-hand end of the cartridge of FIG. 11A.
Figure 12:
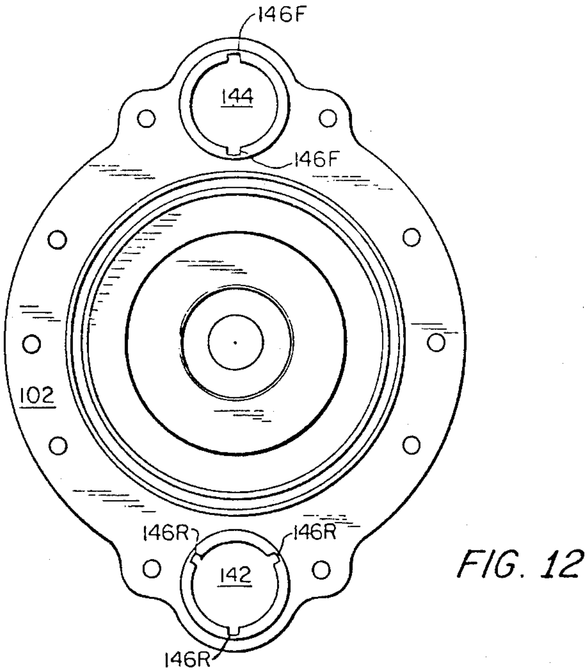
FIG. 12 is an end view of an end section of the pump of FIGS. 8 and 9, including inlet and outlet ports with coded groove configurations therein for selectively receiving either the front or back ends of the valve cartridge of FIG. 11A.

A plurality of check valves to be described further hereinafter with reference to FIGS. 11 to 12 are provided for insertion into the inlet and outlet ports 142, 144 in the end sections 102. These check valve cartridges include a main cylindrical body 122 with O-rings 124 at the ends thereof and a flexible flapper type of check valve 125 including a flexible disc on a central stem. The external surface of the cylindrical cartridges is provided with coded protrusions or bumps to be described further hereinafter with reference to FIGS. 11 to 12. As will become more fully apparent hereinafter, these coded protrusions 123 fit into coded slots 146 in the respective inlet and outlet chambers 142, 144, the respective configurations of the protrusions and slots being such as to preclude the insertion of the check valve cartridges into the inlet and outlet ports in the wrong direction.

Once all of the respective components such as diaphragms 118, check valve cartridges 122, pump shaft 104 and so forth are inserted into the end section 102 of the main pump body, the end caps 100 may be secured to the end sections 102 by suitable screws 126 which extend through apertures in a peripheral flange of the caps 100 into threaded apertures in the periphery of a flange extending around end sections 102. Thus, the end sections 102 of the main pump body and the end caps 100 screwed thereto define the respective discharge chambers of the pump of this embodiment of the present invention.

It should be noted at this juncture that the check valve cartridges 122 of the present invention become sandwiched between the end sections 102 of the pump body and the end caps 100 and both end sections 102 and end caps 100 are provided with coded slot configurations 146 for receiving the coded protrusions on the surface of the check valve cartridge. The end caps 100 are further provided with molded pins extending from the ends thereof disposed in a symmetrical pattern. These pins may be utilized for supporting the pump in a mounting bracket (not shown).

Figure 10:
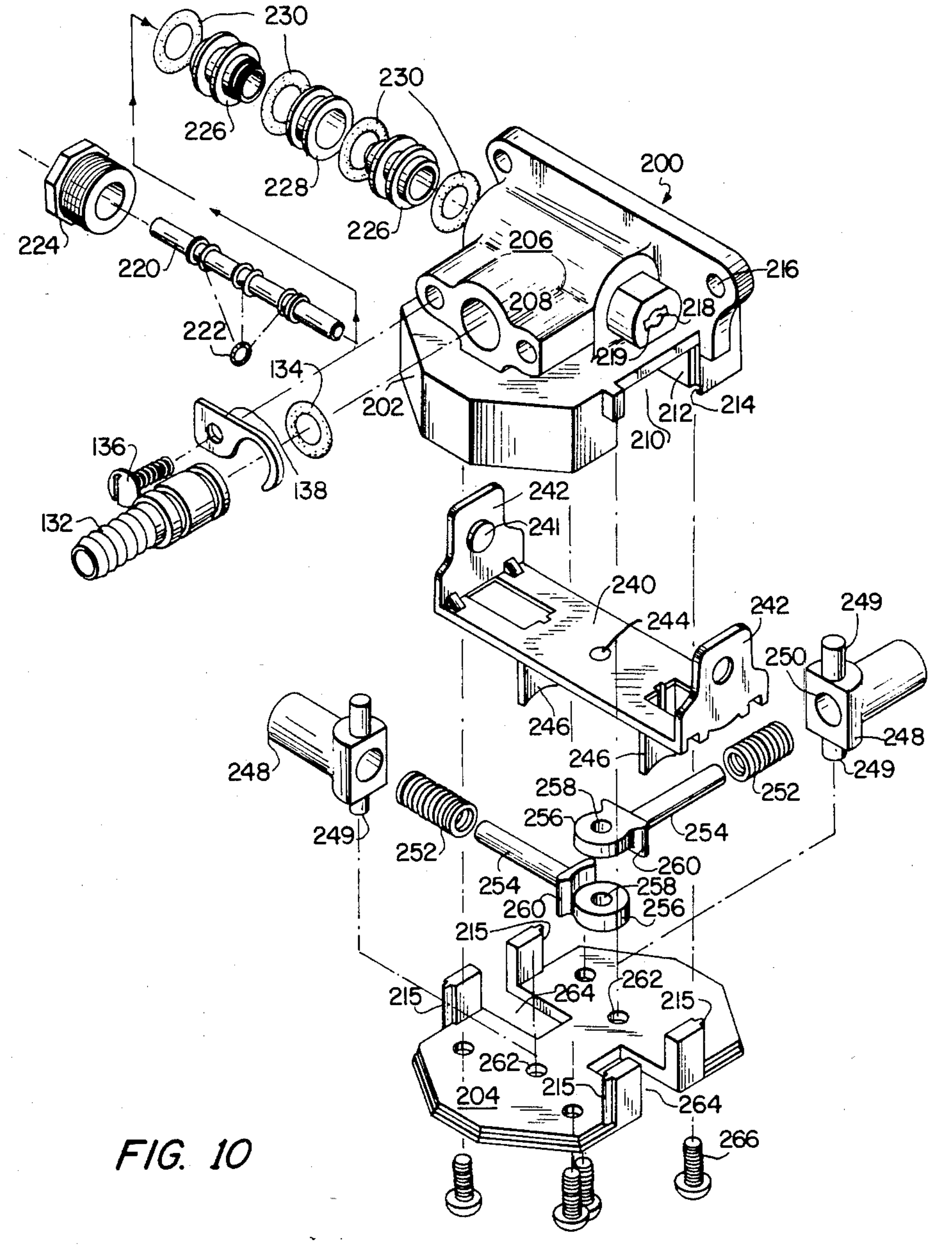
FIG. 10 is an exploded view of the control valve and reversing mechanism module of the present invention attached to the pump of FIG. 8.

A control valve and reversing mechanism module 200 to be further described in connection with FIG. 10 is secured to an appropriate portion of the manifold section of the pump by screws 130 adjacent to and just above the shaft 104 on a bracket 201A which is integrally formed with a driving gas manifold. The gas manifold communicates with both discharge chambers and the outputs of the control valve within module 200. A like bracket 201B is provided at the bottom of the pump housing as illustrated in FIG. 8 and faces the opposite direction from bracket 201A. As illustrated in FIG. 9, the control valve and reversing mechanism module 200 is disposed in operative engagement with a washer 106 fixedly secured to pump shaft 104 by retainer rings 108. As will become more fully apparent hereinafter with respect to FIG. 10, the washer 106 performs a similar function to the pin 25 disposed in the pump shaft of the embodiment of FIG. 1.

Referring in detail to FIG. 10, there is illustrated an exploded view of a combined control valve and reversing mechanism module of the present invention for use with the pump of FIGS. 8 and 9. The module housing is generally indicated 200 and includes a top housing portion 202 and a bottom housing portion 204, the bottom housing portion 204 being slidably received within the top housing portion 202 in an assembled condition by means of slots 214 which receive tongue portions 215 extending upwardly from the bottom housing portion 204. On the underside of housing portion 202, there is provided a slot 210 which extends transversely across the entire top portion 202 and the side walls 212 thereof define bearing surfaces on which the edges of a yoke or actuating member to be described hereinafter may slide parallel to the pump shaft 104. The top of housing portion 202 is molded with chambers therein for receiving the control valve of the present invention which is similar in operation and construction to the control valves 40 illustrated in FIGS. 4 and 5 described hereinbefore. That is, the cylindrical chamber 206 is molded in housing portion 202 for receiving a plurality of interconnected bushing elements and dividing O-rings 230 which define the different sections of the control valve body bore. The bushings include a central inlet bushing 228 which would be juxtaposed within inlet ports such as 45 of the valve of FIGS. 4 and 5 and outlet bushings 226 which would be juxtaposed with the outlet paths 46 and 47 of the valve of FIGS. 4 and 5. These bushings would include peripheral apertures in alignment with respective channels 45, 46 and 47 to permit the flow of fluid therethrough. Disposed for reciprocal sliding movement within the bushings 226 and 228 is a spool member 220 with spaced O-rings 222 thereon of a similar construction to the spool 42 illustrated in the valve of FIGS. 4 and 5. This spool 220 is retained within the cylindrical chamber 206 and the respective bushings described hereinbefore by a screw-type retainer 224 which is screwed into one end of the chamber 206 in housing portion 202. Both retainer 224 and the opposite end of cylindrical chamber 206 are provided with keyholetype ports 218 having enlarged wing portions 219 which permit the escape of exhaust gas during the reciprocal action of the valve. The wing portions 219 provide for better exhaust venting of the gas from the valve and assist in a self-cleaning action of the spool 220. The top housing portion 202 is further provided with an upstanding flange, including apertures 216 therein for receiving screws 130 which attach the entire module 200 to the pump assembly in communication with a suitable manifold structure 141 which supplies driving gas to either one of the pump discharge chambers on the inboard side of the diaphragms to thereby drive the pump in a reciprocating action, as described in detail hereinbefore. The supply of driving gas to the module 200 of FIG. 10 is through inlet port 208 in the top housing portion 202. This inlet port 208 may be fitted with an adaptor 132, retainer hook 138 and O-ring 134 secured thereto by a screw 136 of a similar construction to the adaptors described in connection with FIG. 8 hereinbefore. The provision of these adaptors enables the pump and control valve unit of FIG. 10 to be connected to flexible hoses or tubes.

The module 200 has a reciprocating yoke or actuating member therein between the top and bottom sections 200 and 204. Yoke member 240 slides in slot 210 in top section 202 on bearing surfaces provided by walls 212 thereof. Yoke or actuating member 240 is stamped from sheet metal and is configured with upstanding arms 242 at the opposite end thereof with anvil portions 241 stamped therein for engaging the opposite ends of spool valve element 220 as it reciprocates with the action of the pump shaft. In this regard, a pair of spaced arms 246 extend downwardly from the yoke 240 for engaging the washer 106 on the pump shaft 104, as illustrated in FIG. 9. Yoke 240 is also provided with a downwardly extending pin 244 which fits into apertures 258 in the end of pins 240 of a snap-acting spring mechanism to be described hereinafter. The bottom housing poriton 204 is provided with slots 264 to permit the reciprocal movement of arms 246.

The opposed compression spring snap-acting reversing mechanism utilized in the module 200 of FIG. 10 includes a pair of tubular spring support sockets 248 having bores 250 therein for receiving both coil compression springs 252 and support pins 254 therefor. The springs 252 may be inserted within bores 250 and the pins 254 then inserted within the springs to provide a quick and easy assembly method of this snap-acting mechanism. Extending from the top and bottom of members 248 are pivot pins 249 which are received in aligned apertures 262 in the bottom portion 204 and the top portion 202. Thus, the socket members 248 are sandwiched between the top and bottom housing portions of the module 200 and are pivotally mounted in the apertures 262 in the respective top and bottom portions of the housing. The apertures 262 in the top housing portion 202 are not illustrated, but they are directly aligned within the slot 210 above apertures 262, illustrated in the bottom housing portion 204. The support pins 254 of this embodiment of the present invention also have a unique end bearing structure, including circular end members 256 and arcuate engaging bearing flanges 260. When assembled together, these two end bearing structures, including circular members 256 and arcuate bearing flanges 260, nest one within the other, and the respective circular end members bear against the opposed arcuate bearing flange members 260 of the opposing support sping mechanism. This structure is particularly unique and significant for increasing the life of this spring-acting mechanism and also more compact in size. That is, because of this increased bearing area and nesting arrangement, the bearings have a long life. In addition, this bearing arrangement is particularly efficient and unlikely to bind or stick as the coil springs move over center in the snap-acting fashion described hereinbefore with respect to FIGS. 2 and 3.

All of the parts of the module 200 of FIG. 10 are fabricated from plastic with the exception of yoke member 240, springs 252, spool 220 and bushings 226, 228. Of course, it is also preferable that the screws, such as 266 which hold the two housing portions together, be fabricated from metal. Of course, all parts may be plastic if desired. The operation of the control valve in reversing mechanism module 200 of FIG. 10 should be readily apparent from the description of the alternate embodiments of the present invention described in conjunction with FIGS. 1 to 7. That is, the reciprocation of the spool 220 within the control valve bore 206 causes driving gas to be alternately provided to the discharge chambers of the pump on the inboard side of the diaphragms, depending upon the position of the spool. This movement of one or the other of the diaphragms creates the pumping action and simultaneously reciprocates the pump shaft, causing the shaft and the ring or bushing 150 thereon to engage one of the downwardly extending arms 246 of the yoke member 240. This, in turn, causes the yoke member 240 to reciprocate, and the pin 244 extending downwardly therefrom to apertures 258 in the ends of spring support pins 254 causes pins 254 to rotate about pins 249 of retaining sockets 248. When pins 254 and coil springs 252 thereon move over center (past a line perpendicular to the longitudinal axis of yoke 240), coil springs 252 cause the springs to snap and accelerate the yoke. The arm 242 on the trailing end then bangs against the associated end of spool 220, causing the valve to switch to its opposite bistable position. As in the spring configuration of FIGS. 2 and 3, the symmetrical opposed springs in a common plane precludes the occurrence of transverse forces on the bearing surfaces 212. Thus, yoke 240 will not stick in an intermediate position of the extreme positions of travel. The bearing structure 256, 260 on the ends of pins 254 further decreases any possibility of sticking or binding of the reversing mechanism. Referring in detail to FIGS. 11 and 12, there is illustrated the novel coded valve cartridge of the present invention in conjunction with the inlet and outlet ports in which it is contained. FIG. 11A shows a side elevational view of the valve cartridge of the present invention, including at its front end or the right end, as viewed in FIG. 11A, a pair of diametrically-opposed protrusions 123F, and at the rear or left end, as viewed in FIG. 11A, three spaced protrusions 123R. It should be understood that the third protrusion 123R in FIG. 11A is not illustrated in the side view. However, the third protrusion is illustrated in FIG. 11C, to be described hereinafter. In this regard, FIGS. 11B and 11C are diagrammatic illustrations of only the protrusion configurations of the respective right and left sides of the cartridge illustrated in FIG. 11A. That is, FIG. 11B illustrates two diametrically-opposed protrusions 123F and FIG. 11C illustrates three spaced protrusions 123R.

FIG. 12 illustrates an end section 102 of the pump of FIGS. 8 and 9 of the pesent invention and inlet and outlet ports 142 and 144, respectively. Inlet port 142 includes three spaced grooves 146R for receiving only the three-spaced protrusions 123R of the configuration of FIG. 11C. Therefore, only the rear or left end of the valve cartridge of FIG. 11A can be inserted into inlet port 142. This assures that the check valve within the valve cartridge of FIG. 11A cannot be inserted backwards within the inlet port 142. In a like manner, the diametrically-opposed pair of grooves 146F in outlet port 144 will only receive the protrusion configuration of FIG. 11B which has two diametrically-opposed protrusions 123F. Therefore, only the front or right end of the valve cartridge of FIG. 11A may be inserted into the outlet port 144 in the end section 102 of the pump of the present invention.

Thus, it can be clearly seen that a single valve cartridge having the protrusion coding configuration of FIG. 11A may be utilized for insertion into any one of the four inlet and outlet ports 142, 144 of the pump of the present invention; and it is impossible to insert the cartridges improperly.

In the preferred embodiment of the present invention, the end caps 100 of the pump of FIGS. 8 and 9 also have coded groove configurations for receiving the end of the valve cartridge of FIG. 11A, which is not contained within the inlet and outlet ports 142, 144 of FIG. 12. That is, if the cartridge of FIG. 11 is inserted in the inlet port of FIG. 142, the three spaced protrusions 123R are contained within that port while the diametrically-opposed protrusions 123F at the opposite end of the cartridge extend from the port 142. Therefore, a chamber 147 in end cap 100 of the pump would have a diametrically-opposed pair of slots therein for receiving the pair of diametrically-opposed protrusions 123F. In a similar manner, with the pair of diametrically-opposed protrusions 123F inserted in outlet port 144 and slot 146F, the three spaced protrusions 123R of the cartridge would extend out of outlet port 144. Thus, a chamber 149 in end cap 100 of the pump in FIG. 8 would require the presence of three spaced slots to receive the protrusions 123R therein. In this manner, a double coding of the parts is achieved, so that it is impossible to insert the valve cartridges backwards into the inlet and outlet ports 142 and 144, and it is also impossible to assemble the end caps 100 to the end section 102 without having the check valve cartridges properly inserted within the inlet and outlet ports 142, 144.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:

1. A method of assembling a reversing mechanism module for a double-acting reciprocating pump, said module including, (1) a module housing including first and second separate portions to be connected together,
(2) a guide slot in said module housing,
(3) a valve actuating member to be mounted for reciprocating movement within said guide slot back and forth between two end positions, said valve actuating member having a first actuating means extending transversely from said member on one side of said member, said valve actuating member also having a second actuating means extending transversely from said member on the opposite side of said member, and
(4) snap-acting spring means to be operatively located on support means in said module housing and pivotally coupled to said valve actuating member for rapidly completing the movement of said member from one of its two end positions to the other after said member has already been moved part way to said other end position, comprising the steps of:

(a) placing said valve actuating member in said guide slot;
(b) placing said snap-acting spring means on said support means;
(c) coupling said snap-acting means to said valve actuating member; and
(d) attaching said first and second housing portions together to sandwich said valve actuating member and snap-acting spring means therebetween in operative association with each other, said guide slot, and said support means.

2. An article for use with a double-acting reciprocating pump comprising:

(a) a module housing including first and second separate portions connected together;
(b) a guide slot in said module housing;
(c) a valve actuating member mounted for reciprocating movement within said guide slot back and forth between two end positions, said valve actuating member having a first actuating means extending transversely from said member on one side of said member, said valve actuating member also having a second actuating means on the opposite side of said member; and
(d) snap-acting spring means mounted in said module housing and operatively connected to said valve actuating member for rapidly completing the movement of said member from one of its two end positions to the other after said member has already been moved part way to said other end position.

3. The article according to claim 2 further comprising:

means for removably attaching said first and second housing portions together, said valve actuating member and snap-acting means being sandwiched between said housing portions when said housing portions are attached together, but being readily removable from said housing when said housing portions are separated.

4. The article according to claim 3 wherein said housing portions include support means therein for engaging portions of said valve actuating member and snap-acting means when sandwiched between said housing portions, said portions of said valve actuating member and snap-acting means being retained in engagement with said support means and each other solely by said means for removably attaching said first and second housing portions together.

5. The article of claim 4, wherein said support means for said snap-acting means comprise cavities in said housing portions.

6. An article for use with a double-acting reciprocating pump comprising:

(a) A module housing including a top portion and a separate bottom portion connected thereto and including a pair of opposed sidewalls;
(b) said module housing including a pair of opposed openings in said pair of opposed sidewalls thereof providing a guide slot through said module housing;
(c) a yoke-shaped valve actuating member mounted for reciprocating movement within said guide slot back and forth between two end positions, said valve actuating member having a first pair of spaced-apart arms extending transversely from said member on one side of said member, said valve actuating member also having a second pair of spaced-apart arms extending transversely from said member on the opposite side of said member; and
(d) snap-acting means including compression spring means mounted in said module housing and pivotally connected to said valve actuating member for rapidly completing the movement of said member from one of its two end positions to the other after said member has already been moved part way to said other end position.

7. The article according to claim 6, wherein said bottom portion of said module housing includes an upstanding wall below each of said opposed openings, the top edge of which wall forms a bottom edge of each of said opposed openings, whereby a bottom surface of said valve actuating member rides on said top edge.

8. The article of claim 6, wherein said first pair of spaced-apart arms extends upwardly from a central planar portion of said yoke-shaped valve actuating member and said second pair of spaced apart arms extends downwardly therefrom.

9. The article of claim 6, wherein said snap-acting means is disposed below said yoke-shaped valve actuating member.

10. The article according to claim 6, wherein said snap-acting means includes a pair of elongated pins disposed in a common plane and being located one each on opposite sides of said valve actuating member and each pin having a proximal end pivotally coupled to said valve actuating member and a distal end pivotally coupled about a respective axis fixed relative to said module housing and perpendicular to said common plane, said pins being pivotally movable as said valve actuating member reciprocatingly moves in said guide slot of said module housing, and coil compression spring means surrounding each of said pins and exerting forces on said valve actuating member.

11. The article according to claim 10, wherein at least one of the pairs of distal or proximal ends of said pair of pins is slidably coupled to the axis about which said at least one pair of ends is pivotally coupled.

12. The article according to claim 11, wherein said distal ends of said pair of pins are slidably coupled to said axes fixed relative to said module housing and disposed within a retaining structure also having at least a portion of said coil spring means removably disposed therein, said retaining structure comprising:

tubular sockets for slidably receiving said distal ends of said pins and said coil spring means, and pivot pin means extending from opposite sides of said tubular sockets into mating fixed apertures in said top and bottom portions of said module housing, said mating fixed apertures being disposed on said respective axes fixed relative to said module housing.

13. The article according to claim 10, wherein said proximal ends of said pins are pivotally coupled to said valve actuating member on a common axis.

14. The article according to claim 1, further including:

means for removably attaching said top and bottom housing portions together, said valve actuating member and snap-acting means being sandwiched between said housing portions when said housing portions are attached together, but being readily removable from said housing when said housing portions are separated.

15. The article according to claim 14 wherein said housing portions include support means therein for engaging portions of said valve actuating member and snap-acting means when sandwiched between said housing portions, said portions of said valve actuating member and snap-acting means being retained in operative engagement with said support means and each other solely by said means for removably attaching said top and bottom housing portions togehter.

16. The article of claim 15 wherein said support means comprise cavities in said housing portions.

* * * * *